(12) United States Patent
Tesch

(10) Patent No.: US 7,854,246 B2
(45) Date of Patent: Dec. 21, 2010

(54) METHOD AND DEVICE FOR FORMING A WELD JOINT

(75) Inventor: Wolfgang Tesch, Heimertingen (DE)

(73) Assignee: Urban GmbH & Co. Maschinenbau KG, Memmingen (DE)

( * ) Notice: Subject to any disclaimer, the term of this patent is extended or adjusted under 35 U.S.C. 154(b) by 0 days.

(21) Appl. No.: 12/219,885

(22) Filed: Jul. 30, 2008

(65) Prior Publication Data

US 2009/0032167 A1 Feb. 5, 2009

(30) Foreign Application Priority Data

Jul. 30, 2007 (DE) .................... 10 2007 035 962

(51) Int. Cl.
 *B32B 37/00* (2006.01)
(52) U.S. Cl. .................. 156/580; 156/73.5; 156/378
(58) Field of Classification Search ............ 156/64, 156/73.5, 73.6, 304.1, 304.2, 304.5, 304.6, 156/351, 361, 378, 499, 580; 264/68; 228/112.1, 228/2.1
See application file for complete search history.

(56) References Cited

U.S. PATENT DOCUMENTS

| 5,753,065 | A | | 5/1998 | Buzzelli | |
| 5,902,657 | A | * | 5/1999 | Hanson et al. | 428/36.92 |
| 7,122,088 | B2 | * | 10/2006 | Field et al. | 156/73.5 |
| 2004/0108040 | A1 | * | 6/2004 | Field et al. | 156/73.6 |

FOREIGN PATENT DOCUMENTS

| AT | 391295 B | 9/1990 |
| CH | 402367 A | 11/1965 |
| DE | 2211548 B1 | 12/1972 |

OTHER PUBLICATIONS

German Patent and Trademark Office Search Report dated Nov. 29, 2007.

* cited by examiner

*Primary Examiner*—James Sells
(74) *Attorney, Agent, or Firm*—Jacobson Holman PLLC

(57) ABSTRACT

The invention refers to a method and a device for forming a weld joint at the connecting surfaces between two parts. At the connecting surfaces a heatable element is provided, during warm-up the two parts approach each other, and the heatable element is also moved or positioned depending on the movement or position of the parts.

17 Claims, 1 Drawing Sheet

METHOD AND DEVICE FOR FORMING A WELD JOINT

Figures 1, 2:
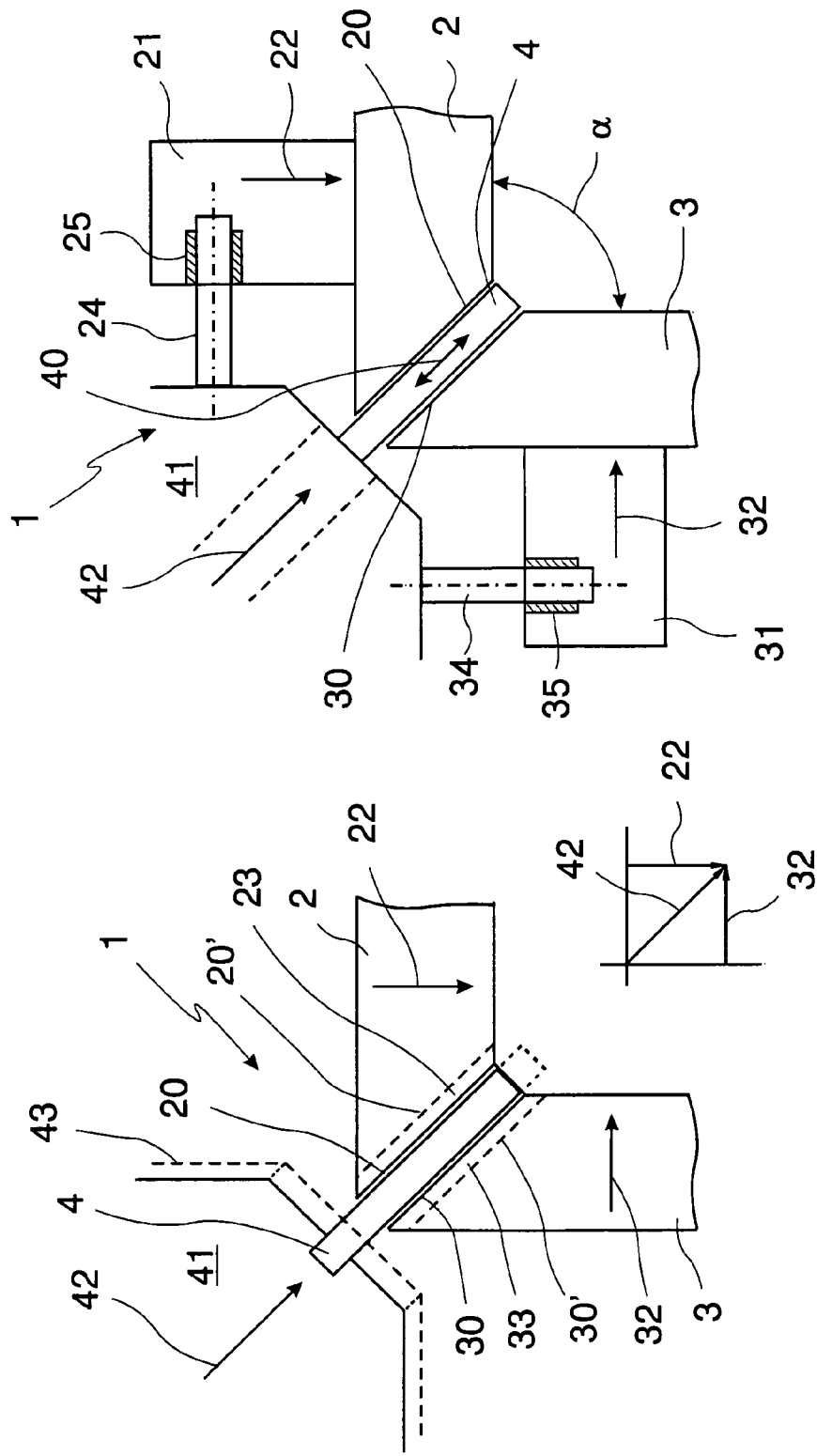

The invention refers to a method and a device for forming a weld joint.

In the state of the art methods for forming a weld joint at the connecting surfaces between two parts consisting of at least partly thermoplastic material and where the two parts connected to each other form an angle differing from 180° are known. For these connecting surfaces here a heatable element is provided arranged during heating the connecting surfaces in the area of the connecting surfaces between the two parts. Furthermore, in the state of the art devices for forming a weld joint at the connecting surfaces between two parts are known where the parts consisting in particular at least partly of thermoplastic material each are arranged on a slide, and a heatable element is arranged between the connecting surfaces for heating the connecting surfaces, and for the slides each a slide drive is arranged. By means of that it is possible that the two parts are moved towards each other during heating.

The device described at the beginning or the method described at the beginning is used for example for welding door or window frames of suitable synthetic profiles. The usual procedure here is to cut the door or window frame profiles into lengths and to cut them, for example, mitred, to clamp them depending on their later angle position in a welding machine, to heat the mitred or connecting (these terms are used here identically without determining here the angle position of the connecting surface with reference to the corner angle) surfaces with a heating reflector until they become plastic, and then, after removing the heating reflector, to press the mitred or connecting surfaces to each other so that then the synthetic thermoplastic material of the two parts or profiles penetrates one another in such a way that a stable and also mechanically capable connection is the result.

Besides this welding method, where the heatable element is designed as electrically heatable heating reflector, also so-called friction welding or vibration welding is known. Here as heatable element an intermediate part is put in which is guided under high frequent vibration or niril movement between the connecting surfaces and in contact with them heats itself and them by the development of friction heat. The intermediate piece is ideally also made of synthetic thermoplastic material, and then welds, on the one hand, itself with a first part/profile and, on the other hand, with the second part profile. As far as in the following only a profile is referred to, this does not restrict the invention to profiles but the terms are used identically.

During heating the respective mitred or connecting surfaces of the parts so-called consumption occurs. This means that the end area of the part or profile facing the connecting surfaces is heated, and the synthetic material through that now in thermoplastic condition is mixed in particular by a pressing movement with the corresponding material of the part or profile to be welded and thus squeezed. Therefore it is known to move during the heating process the two parts to be welded with each other towards each other in order to provide, on the one hand, a sufficient heating of the connecting surfaces even until a certain depth, and, on the other hand, also to reach a widening of the connecting surfaces of the profiles designed as hollow profiles. As, however, the resulting length of the profiles diminishes the interior corner point of the corner joint produced during the welding operation drifts during the warm-up process or also during the welding process.

This drifting of the interior corner point is disadvantageous in particular with the friction welding method with an intermediate piece as there is uneven heating of the intermediate piece as either the intermediate piece has to be shifted forward so far in the area of the interior corner that it covers in any case the interior corner afterward, or the intermediate piece recedes accordingly, and in the interior corner area there is no intermediate piece for the joint. As, however, the intermediate piece is only heated by friction heat at the respective connecting surfaces, and also this heating process requires a certain period of time, the heating is carried out, when the intermediate piece is pushed forward, just at the very end of the pushing movement of the profiles or the slides carrying the profiles. The result is here an insufficient heating, and the weld joint in this area is not at its best.

The result may be here problems of stability at the corner joints.

Therefore the invention has the object to improve the state of the art in that respect that the result is a joint as stable as possible with the known weldings.

In order to solve this problem the invention refers to a method as described in the beginning, and suggests that the heatable element is also moved or positioned depending on the movement or position of the parts. The device according to the invention is characterised in that for the heatable element an element drive is provided so that the element can be moved or positioned according to the movement or position of the slides.

It has to be taken into consideration here that the movement of the parts towards each other during the heating phase is not necessarily continuous but the section movement of approaching is carried out interrupted by breaks of movement. During these breaks of movement also the heatable element is kept in the respective positions or tracks these. The aim of this procedure is, in particular, that the heatable element tracks the changing position of the interior corner of the corner joint to be welded continuously, and thus to heat the complete surface of the intermediate piece used during vibration or friction welding in the same way. As the intermediate piece then at any time is in friction contact with the connecting surfaces or the mitred surfaces, also the intermediate piece is heated in such a way that the result is an optimal weld joint and, in particular, also the interior area of the corner has a clearly higher stability than according to the state of the art.

The suggestion according to the invention, however, cannot only be used in the field of friction welding or vibration welding with an intermediate piece, as described, the principle according to the invention can also be used in a welding process by means of an electrically heated heating element. The result here is also an improved stability of the weld joint as the single points of the connecting surface or mitred surface are not shifted relatively to the heating element. It has to be taken into consideration here that the direction of movement of the profile or the part forms a sharp angle with the position of the heating element, and therefore a movement of the profile or part leads, according to the state of the art, also with heating element welding to a shifting of the contact points of the mitred surface on the heating element. Cleverly then the heating element tracks exactly this movement share, as also the profile or the part is moved. In particular with vertical interior walls here a better welding bead is achieved which has also as a very positive influence on the stability.

Usually, the two connecting surfaces of the part interact directly during the welding process. The connecting surface is here also described as mitred surface, the location of the mitred surface describing, as a rule, the bisecting line of the interior angle of the parts to be connected to each other. However, the invention is in no way defined, the connecting surface interacts, according to an alternative modification also with the connecting piece, the connecting piece then being welded as intermediate piece between the two connecting surfaces, and thus producing a stable connection. If an intermediate piece is used, therefore not one but two welding surfaces exist.

According to the invention thus weld joints are produced which are mechanically more stable, that means solid. Then it is also possible to try, according to the invention, for a shorter machining time or an improvement of the clock frequency as already with a shorter warm-up time by means of the method according to the invention a sufficiently stable weld joint or corner weld joint is available.

In a preferred modification of the method according to the invention a movement of the heatable element synchronous with the movement of the parts is provided. This makes certain that at no time a relative shifting of the contact points of the connecting surfaces at the heating reflector occurs. At the same time this is an effective modus operandi as a section tracking of the heatable element, for example during the movement breaks of the parts, are also part of the invention.

Cleverly in a development according to the invention the movement of the heatable element is formed by a supposition of the movement of the two parts.

By means of such a procedure it is made certain that the heatable element is located on the ideal welding surface which is defined, for example as center plane between the two mitred surfaces, and at the same time defines the symmetric plane for the arrangement of the heatable element. With such a suggestion a procedure as symmetric as possible and thus also a uniform approach of the two parts, which are connected after welding with an angle differing from 180°, is secured.

In a preferred embodiment of the invention an independent element drive is provided. An independent drive here is a separate driving unit for the heatable element. This means that the element drive is not derived, as also provided in another modification according to the invention, from the slide drives or the slide movements, but is built by suitable sensors and a suitable control independently, and connected via these elements with the movement or position of the slides containing the parts or profiles.

Besides this electronic coupling between the movement of the heatable element and the movement of the parts or profiles by the movement of the slides in another modification according to the invention also a mechanic coupling is provided where the element drive is then derived from the slide drives. The advantage of this modification is that a separate independent driving unit for the heatable element is not necessary. By means of that also in a simple way a coupling of the respective slide movements or movements of the parts and the movements of the element drive can be realised.

In a preferred modification of the invention it is provided that the connecting surfaces are orientated essentially parallel, and the heatable element is moved by the element drive in a direction parallel to the connecting surfaces. By means of that an optimal, as evenly running as possible and homogenous heating of the material at the connecting surfaces is achieved, which is convenient for a mechanic stable corner joint or weld joint.

The invention is very variable in view of the design of the parts to be welded. Preferably, for example, profiles like pipes, window or door frame profiles are used as parts, however, the invention is in no way restricted to that. Besides profile-like parts also other parts can be joined with each other according to the invention. The invention can also be used in other cases of application where the connecting surfaces are not identically or similar in their sizes. However, actually, with the use of the invention for producing window or door frames, for example as wing or with a glazing bar, a considerable gain of stability at the corner joints of the frames manufactured in this way can be recognised by the device according to the invention.

Preferably the invention provides that the two parts have a longitudinal extension, and the slide drive of the first slide moves the first part in the direction of the longitudinal extension of the second part, and the slide drive of the second slide moves the second part in the direction of the longitudinal extension of the first part.

Such a modus operandi is a simple and effective way of moving the connecting surfaces during the welding process or the warm-up process towards each other. Cleverly, here almost identical or exactly identical speeds of the respective movement in the referred directions are chosen so that then also the movements of the heatable element are as a result exactly in one direction parallel to the connection surfaces. This leads to operations which can be controlled easily and to high values of stability in the corner joints.

Cleverly an element carrier is provided for the heatable element. Thus, for example, it is provided that the heatable element is designed as an intermediate piece which can be heated by vibrating movement so that the intermediate piece is heated by friction heat at the connecting surfaces. In this case the heatable element carries out an additional movement which is preferably in a direction preferably parallel or identical with the movement of the element.

In this case a separate vibration drive is provided on the element carrier for the heatable element, and the movement is coupled and monitored with reference to the movement of the two slides.

As already explained there are basically two modifications here in order to move or position the element carrier or the element with the movement or position of the two slides, or, synonymously to that, to the position of the profiles or parts.

This can be carried out, for example, in a modification according to the invention by keeping the element carrier or the element movably relatively to the two slides. An embodiment for this arrangement is shown, for example, in the drawing. This is achieved, for example, by a slide guide of the element or the element carrier in both slides, the slide guide being designed preferably parallel to the respective directions of movement of the slides or the parts/profiles.

The result is that the movement of the first slide moves also the element or the element carrier, and thus the distance between the element carrier or element and the second slide changes. However, the element or the element carrier is held and guided at the first as well as at the second slide. The result is a very simple but effective element drive derived from the slide drives.

Of course, it is obvious that the movement of the second slide also moves the element or the element carrier, and, by means of that, the distance between the element carrier or the element and the first slide changes, depending on the direction of movement is enlarged or reduced.

Besides the mechanic coupling also an electronic coupling is provided for the movement of the element. Thus, for example, it is suggested in a modification according to the invention that a position or speed monitored slide drive and a position control is provided for the element drive, at least along two directions. Because of the position or speed monitoring of the slide or the slide drive, the respective position of the interior corner can be defined towards which the respective interior end of the intermediate piece or the heatable element has to be orientated in order to reach a heating as uniform and homogenous as possible of the intermediate piece as well as of the connecting surfaces. Cleverly here the element drive is monitored at least along one direction by the position control, of course, the condition is here that the interior corner is located along this dimension, that means, for example, along the linear guide for the heatable element. However, it is also possible that the position control for the element drive is formed at least along two directions (that means, for example, in a plane), and then, for example, a differing of the interior corner from a linear predefined path can be compensated. In such a modification according to the invention then not compulsorily an absolute synchronism of the slide drives or the movement of the parts, profiles and so on is important. These can be corrected and adapted accordingly through the position control for the element drive.

Cleverly here the movement shares of the two slides are combined in the position control to one movement signal for the element drive. For an optimal positioning of the heatable element here a position or speed monitoring for the element drive is provided so that it is made sure that the heatable element reaches actually the position or the speed which has to be reached according to the position or the speed of the slides or the profiles or parts. If these set values are not reached a corresponding error signal can be issued.

Cleverly it is provided that the direction of movement of the element is the bisecting line of the angle formed by the respective directions of movement of the slides. In this way the geometric connections are defined simply. For an optimal welding result, however, the condition is a synchronous slide or part movement which, however, can be reached by suitable synchronous drives for the slide drives, such a procedure being convenient for an element drive which can be realised easily with mechanic means.

The invention is variable in respect of the design of the heatable element. In an embodiment according to the invention it is provided that it is designed as heating reflector, in particular as electrically heated heating reflector, as it is used for example in plastic frame welding machines.

However, the invention is not determined in that respect, alternatively it is also provided that the heatable element is realised by an intermediate piece which can be heated by vibration movements. For that in the heatable element an additional vibration drive is provided in order to draw the heatable intermediate piece in fast sequence back and forth, and thus to experience by rubbing along the connecting surfaces or the mitred surfaces of the part or profile a warming by friction heat, and thus heats the surfaces which have to be welded with one another.

Usually here vibration drives are known which cause the intermediate piece to oscillate or vibrate at a frequency of 20 to 500 Hz, and generate heating caused by friction.

An advantage of this procedure is that the heating process is carried out directly at the point which is also relevant for welding. With a heating reflector the heating energy has to be transported by a centered heating spiral or a heating cartridge to the surface of the heating reflector, which is accordingly inert and slow and also requires more energy.

Another advantage of the welding by means of vibration or friction welding is a very small welding bead so that polishing is not necessary.

It has already been explained that the intermediate piece as heatable element remains after welding between the connecting surfaces, and thus connects the connecting surfaces indirectly. Basically it is, of course, also possible to remove the intermediate piece after heating accordingly from the area between the two connecting surfaces, and then to weld the two connecting surfaces with each other without interposing the intermediate piece with. These modifications also are part of the invention.

Cleverly the intermediate piece is adapted to the shape of the connecting surfaces which have to be joined in order not to create a projection at the mitred profiles or to form corresponding notches or other ugly areas.

Cleverly the intermediate piece is formed at least partly of thermoplastic material, preferably the same material as the material of the parts, in order to reach a welding result as excellent as possible.

In this connection it is, in particular, pointed out that all characteristics and qualities described with respect to the device, but also methods can be transferred accordingly also with reference to the formulation of the method according to the invention, and can also be used according to the invention, and are seen also as disclosed. The same goes vice versa, that means that all constructive, that means device, characteristics mentioned only with reference to the method can also be taken into consideration in the frame of device claims and be claimed and also are part of the invention and disclosure.

In the drawing the invention is shown schematically. In the drawings:

FIG. 1 in a schematic top view the procedure of the method according to the invention, FIG. 2 also in a schematic top view an example of the device according to the invention.

In FIG. 1 the method according to the invention is shown schematically by means of the device 1 according to the invention.

The method according to the invention is here often used in a device 1 known sufficiently as welding machine. It is an object of a welding machine of this type to join two parts 2, 3, for example profile rods, with each other for forming a rectangular window frame by means of corner welding.

The parts 2, 3 are here mitred and thus form essentially parallel arranged connecting surfaces 20, 30. In the example shown here the two parts 2, 3 are orientated rectangular to each other, however, the invention is in no way restricted to that. Any other connecting angle α can be used according to the invention.

For the actual welding process a suitable warm-up of the connecting surfaces 20, 30 is necessary. According to the materials used in the parts 2, 3 for that purpose, for example a temperature of 150° to 300° is provided. In order to reach this heating between the two parallel running connecting surfaces 20, 30 the heatable element 4 is located. The heatable element 4 is here realised for example as electrically heated heating reflector or as intermediate piece, the intermediate piece heating itself and the connecting surfaces by high frequency vibration at the connecting surfaces.

The thermoplastic material of the part 2, 3 becomes more and more plastic when the temperature rises. After a certain warm-up period the two parts 2, 3, it may also be profile rods 2, 3, approach each other. The direction of movement 22 of the second part 2 is here parallel to the longitudinal extension of the first part 3. The direction of movement 32 of the first part 3 is here parallel to the longitudinal extension of the second part 2.

Parallel receded in the respective part or profile 2, 3 there is another indicated dotted connection surface 20' or 30'. At the level of these connecting surfaces 20', 30' after that, for example, the welding seam extends, that means in a welding procedure realised as heatable element 4 by a heating reflector the connecting surface 20' is located upon the connecting surface 30'. The material which is located between the connecting surface 20' and 20, or 30' and 30 is called consumption 23 or 33 and forms the actual welding with the respective consumption material. These materials penetrate one another as they have become accordingly thermoplastic and flow into each other when they then are pressed and squeezed one upon the other. In another procedure according to the invention by the approaching movements 22, 32 the connecting surfaces 20', 30' do not cover each other but they are pressed to an intermediate piece as heatable element 4 arranged between the two connecting surfaces 20, 30, which then heats the surfaces, for example by a fast vibration and friction at the respective surfaces. The intermediate piece also is cleverly thermoplastic, and is then joined in a weld joint, as soon as the warm-up period is over, to the respective connecting surfaces 20', 30' of the two parts 2, 3, which are designed, for example, as profiles.

It can be seen clearly that because of the directions of movement 22, 32, which are in this example orthogonal, the interior corner of the welded parts 2, 3 is located on the right hand side below the element 4 drawn with a full line. If the heatable element 4 is stationary or oscillates with high frequency around a stationary position the heatable element will not heat anymore the entire connecting surface at the time when the two parts take on the movement according to the directions 22, 32. Uneven heating, however, leads to poor weld joints, and thus to accordingly poor weld joints with restricted mechanic stability. This has to be avoided as described in the beginning.

According to the invention this is reached by having the heatable element following the drifting movement of the interior corner and shifting it in the direction of the arrow 42. The movement arrows thus are indicated in FIG. 1 schematically in the arrow triangle shown below on the right hand side. The movement arrow 42 is the vectorial addition of the two movement arrows 22 and 32 which the two parts 2 and 3 carry out. This procedure makes sure that the complete connecting surface 20 or 20' but also 30 or 30' is heated evenly and completely in order to form a stable weld joint. Reference number 41 indicates schematically the element carrier. In the embodiment shown here also the complete element carrier 41 is moved forward in the direction of arrow 42 in order to reach the new position indicated by the contour 43 in a dotted line. It is clear here that this movement does not compulsorily has to be carried out by the element carrier 41, but also, if necessary, only by the heatable element 4 having suitable drives and so on.

In FIG. 2 an embodiment of the device 1 according to the invention is shown where in a simple but very effective way the element drive is derived from the movement of the two parts 2, 3.

The two parts 2, 3 each are clamped on a slide 21, 31. The slide can move by suitable drives, for example pneumatic cylinders or electric drives, in the direction of the movement directions 22, 32.

The heatable element is realised in the embodiment shown here as an intermediate part which can be heated by vibration energy, the vibration energy is indicated by the double arrow 40. As because of that the heatable element moves oscillating, in this example the heatable element is not connected directly but via the element carrier 41 with the two slides 21, 31. One driving pin 24, 34 arranged each parallel to the respective directions of movement 22, 32 of the slides 21, 31 each serves for this purpose. Here in particular the driving pin 24 is arranged rectangular to the direction of movement 22 of the slide 21 for the second part 2, and in particular parallel to the direction of movement 32 of the part 3 or slide 31. However, a rigid coupling between the element carrier 41 and the two slides 21, 31 is not provided, but the pins 24, 34 dip in respective sliding bearings 25, 35 of the two slides 21, 31. The way of functioning is now that, if only slide 21 of the second part 2 is moved in directions downwards according to the direction of movement 22, this direction of movement is transferred from the driving pin 24 to the element carrier 41, and the carrier 42 as well as the heatable element 4 held at it is shifted downward in the same way. However, as the longitudinal axis of the other driving pin 34 is orientated parallel to the direction of movement 22, and this is guided in a slide guide 35 of the slide 31, the distance between the element carrier 41 and the slide 31 is diminished. The same occurs, of course, to the right hand side with a corresponding movement of the slide 31 of the first part 3 according to arrow 32. In this case then the driving pin 24 dips in the slide guide 25. If now the two parts 2, 3 are moved, the first part 3 being moved parallel to the longitudinal extension of the second part 2 and vice versa, these movement components add up to the resulting movement component 42 of the element carrier 41, and the zero position of the oscillating heatable element 4 is also shifted by this distance and direction.

The claims filed with the application now and to be filed later on are attempted formulations without prejudice for obtaining a broader protection.

If here, on closer examination, in particular also of the relevant prior art, it turns out that one or the other feature may be convenient for the object of the invention, however, not decisively important, of course, already now a formulation is striven for which does not contain anymore such a feature, in particular in the main claim.

Furthermore it has to be taken into consideration that the embodiments and modifications of the invention described in the different examples and shown in the figures can be combined with each other in any way. Here single or several characteristics can be exchanged at will. These combinations of characteristics are also disclosed.

References in the sub-claims relate to the further design of the matter of the main claim through the characteristics of the respective sub-claim. These are, however, not to be understood as a waiver of independent protection of the matter for the characteristics of the referred sub-claims.

Characteristics only disclosed in the description so far may now, in the course of proceedings, be claimed as being of inventive relevance, for example to distinguish from the state of the art.

Characteristics only disclosed in the description or even single characteristics of claims comprising a number of characteristics may be taken over in the first claim at any time to distinguish from the state of the art, and this is even if such characteristics have been mentioned in connection with other characteristics, or achieve particularly convenient results in connection with other characteristics, respectively.

The invention claimed is:

1. A device for forming a weld joint at connecting surfaces between two parts, a first part and a second part, consisting of at least partly thermoplastic material, with the two connected parts forming an angle differing from 180°, wherein a heatable element for the vibration or friction welding is provided as an intermediate piece between the connecting surfaces, the heatable element being arranged during heating of the connecting surfaces in an area of the connecting surfaces between the two parts, each of the two parts being arranged on a slide, a first slide and a second slide, a slide drive being provided for each of the slides in order to move the heated connecting surfaces towards each other, wherein an element drive is provided for the heatable element, so that the heatable element as the intermediate piece can be moved or positioned according to the movement or position of the first and second slides, wherein the movement of the heatable element as an intermediate piece is formed from a superposition of the movement of the two parts, each of which is arranged on the first and second slides, and wherein the element drive is derived from the slide drives.

2. The device according to claim 1, characterised in that the heatable element is designed as intermediate piece which can be heated by a vibration movement.

3. The device according to claim 1, characterised by an independent element drive of the element designed as intermediate piece.

4. The device according to claim 1, characterised in that the connecting surfaces are orientated essentially parallel, and the intermediate piece as heatable element is moved by the element drive in a direction parallel to the connecting surfaces.

5. The device according to claim 1, characterised in that the parts are designed as profiles, a pip, window frame or door frame profiles.

6. The device according to claim 1, characterised in that the two parts have a longitudinal extension, and the slide drive of the first slide moves the first part in the direction of the longitudinal extension of the second part, and the slide drive of the second slide moves the second part in the direction of the longitudinal extension of the first part.

7. The device according to claim 1, characterised in that for the intermediate piece an element carrier is provided as heatable element.

8. The device according to claim 1, characterised in that for the intermediate piece as heatable element and the element carrier or the element is held by the two slides relatively movable to these.

9. The device according to claim 1, characterised in that the movement of the first slide also moves the element or an element carrier, and the distance between the element carrier or the element and the second slide changes.

10. The device according to claim 1, characterised by a sliding guide in the direction of movement of the second slide or the element designed as intermediate piece or the element carrier and the first slide.

11. The device according to claim 1, characterised by a position or speed monitored slide drive and a position control for the element drive at least along one direction.

12. The device according to claim 1, characterised in that a position control is provided for the element drive, and the movement shares of the two slides are combined in the position control to a movement signal for the element drive.

13. The device according to claim 1, characterised by a position or speed monitoring for the element drive.

14. The device according to claim 1, characterised in that the direction of movement of the element designed as intermediate piece is the bisecting line of the angle formed by the respective directions of movement of the slides.

15. The device according to claim 1, characterised in that the intermediate piece as heatable element remains after welding between the connecting surfaces.

16. The device according to claim 1, characterised in that the intermediate piece as heatable element corresponds with the view of the connecting surfaces which have to be joined.

17. The device according to claim 1, characterised in that the intermediate piece consists at least partly of thermoplastic material, or the same material as the material of the parts.

* * * * *